United States Patent
Davidesko et al.

(10) Patent No.: US 12,129,932 B2
(45) Date of Patent: Oct. 29, 2024

(54) AIR VALVE WITH EXTERNAL LIQUID LEVEL SENSOR

(71) Applicant: A.R.I. Fluid Control Accessories Ltd., Kfar Charuv (IL)

(72) Inventors: Amir Davidesko, Binyamina Givat Ada (IL); Moshe Aylon, Nofit (IL)

(73) Assignee: Aquestia Ltd., Kfar Charuv (IL)

( * ) Notice: Subject to any disclaimer, the term of this patent is extended or adjusted under 35 U.S.C. 154(b) by 0 days.

(21) Appl. No.: 17/275,229

(22) PCT Filed: Sep. 8, 2019

(86) PCT No.: PCT/IB2019/057557
§ 371 (c)(1),
(2) Date: Mar. 11, 2021

(87) PCT Pub. No.: WO2020/053729
PCT Pub. Date: Mar. 19, 2020

(65) Prior Publication Data
US 2022/0042614 A1    Feb. 10, 2022

Related U.S. Application Data

(60) Provisional application No. 62/730,609, filed on Sep. 13, 2018.

(51) Int. Cl.
*F16L 37/00* (2006.01)
*F16K 24/04* (2006.01)
*F16K 37/00* (2006.01)
*F16L 55/07* (2006.01)

(52) U.S. Cl.
CPC ............ *F16K 24/04* (2013.01); *F16K 37/005* (2013.01); *F16L 55/07* (2013.01)

(58) Field of Classification Search
CPC .............................. F16L 55/07; F16K 37/005
See application file for complete search history.

(56) References Cited

U.S. PATENT DOCUMENTS 6,050,245 A * 4/2000 Cook .................... F16K 27/029
123/520
9,430,930 B2 * 8/2016 Finn ........................ G08B 21/20
(Continued)

FOREIGN PATENT DOCUMENTS

JP    2001027347    1/2001
JP    2012196816    10/2012

OTHER PUBLICATIONS

Original and Translation of JP 2001027347 A; Yonemura, Masao; Jul. 15, 1999.*
(Continued)

*Primary Examiner* — Paul J Gray
(74) *Attorney, Agent, or Firm* — Dekel Patent Ltd.; David Klein

(57) ABSTRACT

An air valve assembly (10) includes a main housing (12) including a coupling flange (14) for coupling to a pipe, and an air valve (20) fluidly coupled to the main housing (12). An actuator (28) is in fluid communication with the air valve (20) and a discharge tube (40). A non-contact liquid level sensor (30) is located in an external housing coupled to the main housing (12). The non-contact liquid level sensor (30) is in operative communication with the actuator (28).

8 Claims, 1 Drawing Sheet

(56) References Cited

U.S. PATENT DOCUMENTS

| | | | | |
|---|---|---|---|---|
| 2009/0140866 A1* | 6/2009 | Heilmann | ............ | G01M 3/186 |
| | | | | 340/605 |
| 2014/0261742 A1* | 9/2014 | Heise | ................ | H01M 8/04776 |
| | | | | 137/72 |
| 2016/0356026 A1* | 12/2016 | Engler | ...................... | E03F 5/22 |

OTHER PUBLICATIONS

PCT Search Report and Written Opinion PCT/IB2019/057557, Jan. 31, 2020.

* cited by examiner

AIR VALVE WITH EXTERNAL LIQUID LEVEL SENSOR

FIELD OF THE INVENTION

The present invention generally relates to air valves and particularly to an air valve assembly with an external liquid level sensor.

BACKGROUND OF THE INVENTION

Pipelines, such as those in potable water and wastewater treatment systems, are subject to unwanted air build-up and vacuum conditions that can interfere with the proper flow of water or other liquids through the pipelines. Air valves are commonly installed on pipelines to prevent such air and vacuum related problems.

The air valve may be connected to the pipeline by a gate valve, knife gate valve, ball valve, diaphragm valve or other valve. The air valve may be an air valve, vacuum valve, an air release valve, kinetic, automatic, or a combination-type air valve. A combination air valve exhausts air from the pipeline to prevent unwanted air build-up, and introduces air into the pipeline to prevent vacuum conditions in the pipeline. As used herein, the term "air valve" is meant to encompass any device that exhausts air from and/or admits air into the pipeline.

Air valves operate with floats or other internal components that move in accordance with the level of liquid present in the valve to control operation of the valve.

SUMMARY OF THE INVENTION

The present invention seeks to provide an air valve assembly, which in contrast with the prior art, has an external liquid level sensor, as is described more in detail hereinbelow. The external liquid level sensor is not positioned inside the body of the valve. In a preferred embodiment, the liquid level sensor is not in contact with the liquid.

There is thus provided in accordance with an embodiment of the present invention an air valve assembly including a main housing including a coupling flange for coupling to a pipe, an air valve fluidly coupled to the main housing, an actuator in fluid communication with the air valve and a discharge tube, and a non-contact liquid level sensor located in an external housing coupled to the main housing, the non-contact liquid level sensor being in operative communication with the actuator.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figures 1, 2:
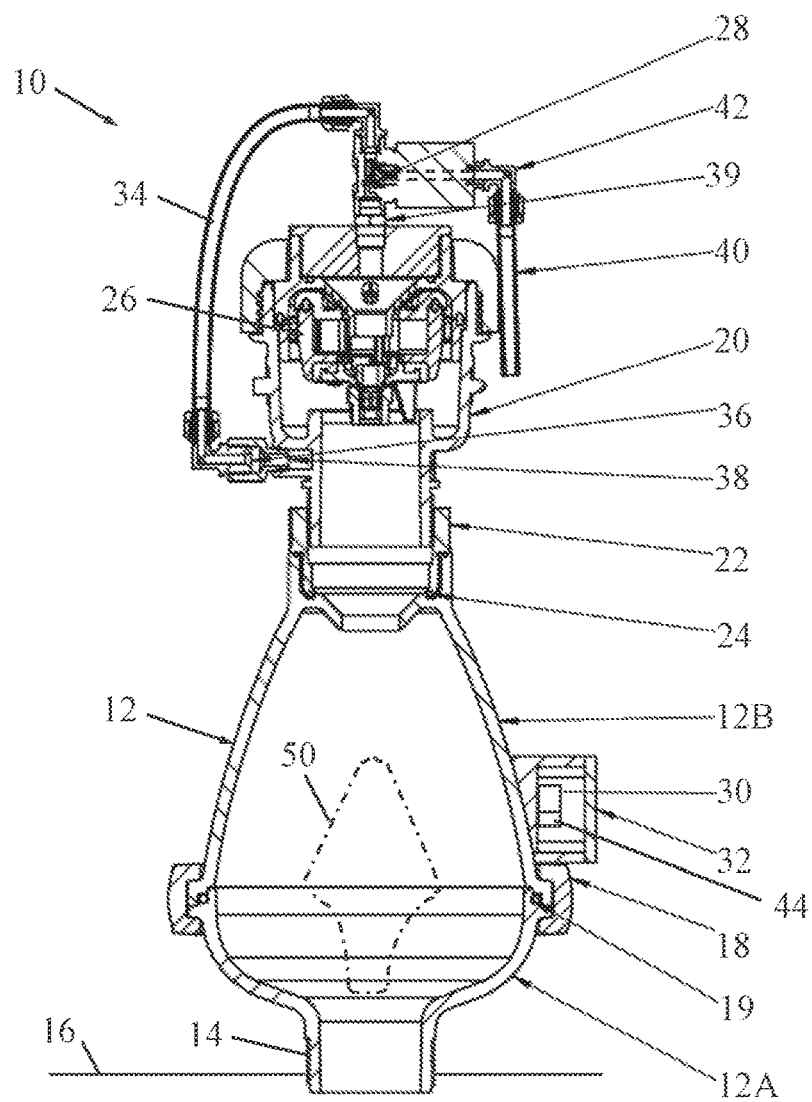
FIG. 1 is a simplified sectional illustration of an air valve assembly, constructed and operative in accordance with an embodiment of the present invention, taken along lines B-B in FIG. 2.
FIG. 2 is a simplified, partially cutaway, top-view illustration of the air valve assembly.

Reference is now made to FIG. 1, which illustrates an air valve assembly 10, constructed and operative in accordance with an embodiment of the present invention.

Air valve assembly 10 incudes a main housing 12, which may be round and may taper from the bottom towards the top, although other shapes are contemplated as well. Main housing 12 has a coupling flange 14 at its bottom surface for coupling to a liquid supply line (pipe) 16. Main housing 12 may be of one-piece construction, or as shown in the drawing, may be made of two parts 12A and 12B secured together by a clamping band 18 that tightens against an O-ring 19 to seal the two halves of the housing 12. As seen in FIG. 2, clamping band 18 may be tightened with fasteners, such as bolt 11, washer 13 and nut 15.

Main housing 12 may be coupled to an air valve 20. The illustrated air valve 20 is similar to, but with important novel structure not included in, the D-070 dynamic combination air valve, commercially available from A.R.I. Flow Control Accessories Ltd., Israel. However, the invention is not limited to this particular air valve and may be used with air other air valves, such as the air valves described in U.S. Pat. No. 9,261,201, assigned to A.R.I. Flow Control Accessories Ltd. or other air valves, but again with important novel structure not included in any prior art air valve, as in described below. As stated above, "air valve" encompasses any device that exhausts air from the pipeline or admits air into the pipeline, or which is capable of both exhausting air and admitting air, such as a combination air valve that can exhaust air from the pipeline to prevent unwanted air build-up and can introduce air into the pipeline to prevent vacuum conditions in the pipeline.

Main housing 12 may be coupled to air valve 20 either directly or with an adaptor 22, the connection between the two being sealed by a seal 24, such as an O-ring.

Air valve 20 may include, without limitation, a purging unit 26 that includes a rolling diaphragm and check valve for closing the valve under pressure and opening the valve in a vacuum situation, thus preventing slam and local up-surges. When vacuum (down-surge) occurs, the valve reacts quickly, with the aid of the check valve, to admit large volumes of air into the water system, thus impeding down-surges and, consequently, all pressure surges in the line. The air and vacuum component of the air valve is normally closed when the line is not operating, thus preventing the infiltration of debris and insects into the system.

Unlike any prior art air valve, air valve 20 includes an actuator 28 which is in communication with an external liquid level sensor 30 located in an external housing 32 secured to main housing 12. One non-limiting example of actuator 28 is a solenoid, which may be in wired or wireless connection with sensor 30. Other examples of suitable actuators include a pneumatic or hydraulic actuator, which may be controlled by sensor 30, by electric, pneumatic or hydraulic connection.

The actuator 28 is in fluid communication with the inlet to air valve 20, such as but not limited to, via a conduit 34 which may be coupled to the inlet of air valve 20 with an elbow connector 36 and a bushing 38. The actuator 28 is in fluid communication with the inner chamber of air valve 20, such as but not limited to, via a fluid connection 39.

The actuator 28 is in fluid communication with a discharge tube 40, such as but not limited to, via another elbow connector or other connector 42.

The actuator 28, conduit 34 other components for communicating with sensor 30 can either be external to the body of the valve or can be internal, The external liquid level sensor 30 is also referred to as non-contact liquid level sensor 30. One non-limiting example of a non-contact liquid level sensor is a capacitance sensor that senses the electrical capacitance in the vicinity of the sensor. When no liquid is present in the vicinity of the sensor, the electrical capacitance is at a certain value; when liquid is present in the vicinity of the sensor, the electrical capacitance changes, thus indicating that liquid has reached the level in housing 12 opposite the sensor 30.

Another non-limiting example of a non-contact liquid level sensor is an optical sensor that has a window through which the inside of housing 12 can be viewed and monitored if liquid is present in the vicinity of the sensor.

Another non-limiting example of a non-contact liquid level sensor is a diaphragm level sensor or switch. The diaphragm (membrane) moves in response to pressure of fluid against the diaphragm, thereby providing a signal that liquid has risen to the level of the diaphragm. This is considered a non-contact liquid level sensor because the diaphragm seals the inner components of the sensor from contacting the liquid.

Sensor 30 may operate with a controller or processor 44, which may be part of the sensor.

The operation of air valve assembly 10 is now described. The air valve assembly 10 can have two modes of operation: introducing air into the pipeline to prevent vacuum conditions in the pipeline and expelling air from the pipeline to prevent unwanted air build-up.

To prevent vacuum conditions in the pipeline, the discharge tube 40 will be gradually closed. The liquid flowing through pipe 16 enters the air valve 12 via inlet 14 and eventually reaches the level opposite the sensor 30. The sensor 30 senses that the liquid has reached this level and sensor 30 or processor 44 sends a command signal to actuator 28 to close discharge tube 40. The closure rate and internal flow area of discharge tube 40 are controlled by actuator 28 as controlled by sensor 30 or processor 44.

To prevent unwanted air build-up, the discharge tube 40 will be gradually opened. Air from the pipe 16 enters the air valve 10 via inlet 14. The air is lighter than any liquid in the valve 10, and the air that has entered pushes the liquid that is present up to the level opposite sensor 30. The sensor 30 senses that the air has reached this level and sensor 30 or processor 44 sends a command signal to actuator 28 to open discharge tube 40. The opening rate and internal flow area of discharge tube 40 are controlled by actuator 28 as controlled by sensor 30 or processor 44.

In accordance with an embodiment of the invention, guiding structure 50 (shown in broken lines in FIG. 1) may be provided in main housing 12 for guiding or diverting fluid (fluid means liquid or gas) to flow towards the area inside housing 12 next to external liquid level sensor 30. For example, guiding structure 50 may be a baffle or curved wall that causes the liquid to circulate or flow faster towards sensor 30. Accelerating the flow towards the sensor 30 may improve the speed at which the sensor reacts to fluid rising to cause the actuator 28 to take action.

Although in a preferred embodiment, the liquid level sensor is not in contact with the liquid, in an alternative solution for certain applications, a liquid level sensor which does contact the liquid may be used to send the signal to the actuator 28.

What is claimed is:

1. An air valve assembly comprising:
   a main housing comprising a coupling flange for coupling to a pipe;
   an air valve fluidly coupled to said main housing, said main housing having walls that extend from said coupling flange to said air valve, said walls surrounding and defining an inner chamber in said main housing, said inner chamber being bounded by said walls, said air valve and said coupling flange;
   an actuator in fluid communication with an inlet to said air valve and with a discharge tube; and
   a non-contact liquid level sensor located in an external housing coupled to said main housing, said non-contact liquid level sensor being in operative communication with said actuator, and wherein said main housing comprises a guiding structure for guiding or diverting fluid to flow towards an area inside said main housing next to said external liquid level sensor, said guiding structure comprising a baffle or curved wall that causes the liquid to circulate or flow faster towards said sensor, wherein said guiding structure is separate from said walls and is located inside said inner chamber radially inwards from said walls, and said guiding structure protrudes upwards from a bottom of said inner chamber, and wherein said guiding structure tapers towards an upper end of said inner chamber.

2. The air valve assembly according to claim 1, wherein said actuator comprises a solenoid.

3. A method of using the air valve assembly of claim 1, wherein to prevent vacuum conditions in the pipe, liquid flowing through said pipe enters the air valve and reaches a level opposite said sensor and said sensor senses that the liquid has reached this level and commands said actuator to close said discharge tube, and to prevent unwanted air build-up, air from said pipe enters said air valve and pushes the liquid that is present up to the level opposite said sensor and commands said actuator to open said discharge tube.

4. The air valve assembly according to claim 1, wherein said non-contact liquid level sensor comprises a capacitance sensor that senses electrical capacitance in a vicinity of said sensor.

5. The air valve assembly according to claim 1, wherein said non-contact liquid level sensor comprises a processor.

6. The air valve assembly according to claim 1, wherein said non-contact liquid level sensor is in wireless communication with said actuator.

7. The air valve assembly according to claim 1, wherein said guiding structure has an outer contour shaped differently than inner surfaces of said walls.

8. The air valve assembly according to claim 1, wherein said guiding structure widens at a middle portion of said guiding structure, and then tapers towards a lower end of said inner chamber.

* * * * *